(12) United States Patent
Lee et al.

(10) Patent No.: US 7,069,481 B2
(45) Date of Patent: *Jun. 27, 2006

(54) DATA RECOVERY CIRCUIT FOR MINIMIZING POWER CONSUMPTION BY NON-INTEGER TIMES OVERSAMPLING

(75) Inventors: Jin-kug Lee, Yongin (KR); Yong-sub Kim, Seoul (KR); Gun-sang Lee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 472 days.

This patent is subject to a terminal disclaimer.

(21) Appl. No.: 10/193,051

(22) Filed: Jul. 11, 2002

(65) Prior Publication Data

US 2003/0041292 A1    Feb. 27, 2003

(30) Foreign Application Priority Data

Aug. 27, 2001  (KR) .............................. 2001-51772

(51) Int. Cl.
*G06F 11/00* (2006.01)

(52) U.S. Cl. ...................... 714/707; 714/700; 714/744

(58) Field of Classification Search ................ 714/707, 714/731, 744, 700, 703; 713/503
See application file for complete search history.

(56) References Cited

U.S. PATENT DOCUMENTS

| 3,946,379 | A | * | 3/1976 | Lippman | 341/100 |
| 4,109,236 | A | * | 8/1978 | Besenfelder et al. | 714/709 |
| 5,313,496 | A | * | 5/1994 | de Goede | 375/342 |
| 5,850,422 | A | * | 12/1998 | Chen | 375/371 |
| 6,272,193 | B1 | * | 8/2001 | Eglit | 375/355 |
| 6,801,591 | B1 | * | 10/2004 | Frencken | 375/373 |
| 6,847,789 | B1 | * | 1/2005 | Savoj | 398/155 |

* cited by examiner

*Primary Examiner*—Guy Lamarre
*Assistant Examiner*—Fritz Alphonse
(74) *Attorney, Agent, or Firm*—Mills & Onello LLP (57) ABSTRACT

A data recovery circuit has a phase-locked loop for generating a plurality of clock signals; an oversampling unit for non-integer times oversampling serial data, and outputting the oversampled result as sample data formed of a plurality of bits; a pattern detector for receiving the sample data, and generating a pattern signal; a state accumulator for receiving the pattern signal, accumulating the frequency of occurrence of the pattern signal, and outputting the pattern signal having the highest frequency of occurrence as a state signal; a state selector for receiving the state signal, and generating a state selection signal for selecting bits at predetermined positions in the sample data; and a data selector for receiving the sample data, selecting bits of the sample data in response to the state selection signal, and outputting the selected bits as recovered data formed of a plurality of bits.

31 Claims, 10 Drawing Sheets

| PATTERN SIGNAL / SAMPLING TYPE | CHARACTERISTICS | DETECTING POINTS |
|---|---|---|
| PATS1 / CASE1 | D0=D1≠D2, D2=D3=D4≠D5=D6 | D1≠D2 & D4≠D5 |
| PATS2 / CASE2 | D0=D1=D2≠D3=D4≠D5=D6=D7 | D2≠D3 & D4≠D5 |
| PATS3 / CASE3 | D1=D2≠D3=D4=D5≠D6=D7 | D2≠D3 & D5≠D6 |
| PATS4 / CASE4 | D0≠D1=D2=D3≠D4=D5≠D6=D7 | D0≠D1 & D3≠D4 & D5≠D6 |
| PATS5 / CASE5 | D2=D3≠D4=D5=D6≠D7 | D3≠D4 & D6≠D7 |

| STATE SELECTION SIGNAL | MULTIPLEXER INPUT | MULTIPLEXER OUTPUT | SAMPLING TYPE |
|---|---|---|---|
| SELS[0:2]=000 | D0–D7 | D0, D3, D6 | CASE1 |
| SELS[0:2]=001 | | D1, D3, D6 | CASE2 |
| SELS[0:2]=010 | | D1, D4, D7 | CASE3 |
| SELS[0:2]=011 | | D2, D4, D7 | CASE4 |
| SELS[0:2]=100 | | D0, D2, D5 | CASE5 |

DATA RECOVERY CIRCUIT FOR MINIMIZING POWER CONSUMPTION BY NON-INTEGER TIMES OVERSAMPLING

BACKGROUND OF THE INVENTION

1. Field of the Invention

The present invention relates to a data transmission circuit, and more particularly, to a data recovery circuit and method for reducing power consumption and minimizing errors due to clock skew by performing non-integer times oversampling sampling.

2. Description of the Related Art

In most present image processing systems, data is processed in a digital region and an interface between systems uses an analog signal that is simple to implement. However, the interface using an analog signal has a drawback of limited accuracy due to noise between signals and other analog errors. To solve this problem, it is more efficient to directly transmit a digital signal.

Generally, in a data transmission system for transmitting predetermined data, a method using parallel data channels is widely used for digitally interfacing between systems. However, as the number of data transmission channels increases, the method using parallel data channels may suffer from problems. For this reason, a recent trend is to use serial transmission instead of parallel transmission.

The method using serial transmission channels has an advantage over the method using parallel transmission channels in that fewer channels are used. However, in most cases, if data is transmitted using serial transmission channels, a high-speed serial signal should be recovered to a parallel data signal at the receiving end. At this time, when serial data is recovered to a parallel data format, data recovery may be difficult due to clock skew at the receiving end.

To solve this problem, in conventional technology, a bit section of a received signal is two or three times oversampled and data having a high frequency is determined as actual data. However, the two times oversampling has a drawback of lower accuracy, and the three times oversampling has a drawback in that it is difficult to implement a circuit for generating high-speed clock signals.

SUMMARY OF THE INVENTION

To solve the above problems, it is a first objective of the present invention to provide a data recovery circuit for minimizing power consumption by non-integer times oversampling.

It is a second objective of the present invention to provide a data recovery method for minimizing power consumption by non-integer times oversampling.

In accordance with an aspect of the present invention, there is provided a data recovery circuit having a phase-locked loop for generating a plurality of clock signals, each of which is synchronized to an input clock signal and has a different delay time; an oversampling unit for non-integer times oversampling serial data which is input from the outside, in response to the plurality of clock signals, and outputting the oversampled result as sample data formed of a plurality of bits; a pattern detector for receiving the sample data formed of the plurality of bits, and generating a pattern signal formed of a plurality of bits by detecting level transitions between bits of the sample data; a state accumulator for receiving the pattern signal formed of the plurality of bits, accumulating the frequency of occurrence of the pattern signal, and outputting the pattern signal having the highest frequency of occurrence as a state signal formed of a plurality of bits; a state selector for receiving the state signal formed of the plurality of bits, and generating a state selection signal formed of a plurality of bits for selecting bits at predetermined positions in the sample data; and a data selector for receiving the sample data, selecting bits of the sample data in response to the state selection signal, where the bits correspond to the state selection signal, and outputting the selected bits as recovered data formed of a plurality of bits.

It is preferable that the oversampling unit have a plurality of sampling means, each for receiving the serial data, sampling the serial data in response to each of the plurality of clock signals, and outputting one bit of the sample data.

It is preferable that the oversampling unit 2.7 times oversamples each one bit section of the input serial data.

In accordance with another aspect of the present invention, there is provided a data recovery method including (a) generating a plurality of clock signals, each of which is synchronized to an input clock signal and has a different delay time; (b) non-integer times oversampling serial data which is input from the outside, in response to the plurality of clock signals, and outputting the oversampled result as sample data formed of a plurality of bits; (c) receiving the sample data formed of the plurality of bits, and generating a pattern signal formed of a plurality of bits by detecting level transition between bits of the sample data; (d) receiving the pattern signal formed of the plurality of bits, accumulating the frequency of occurrence of the pattern signal, and outputting the pattern signal having the highest frequency of occurrence as a state signal formed of a plurality of bits; (e) receiving the state signal formed of the plurality of bits, and generating a state selection signal formed of a plurality of bits for selecting bits at predetermined positions in the sample data; and (f) receiving the sample data, selecting bits of the sample data in response to the state selection signal, where the bits correspond to the state selection signal, and outputting the selected bits as recovered data formed of a plurality of bits.

It is preferable that in step (b) each one bit section of the input serial data is 2.7 times oversampled.

Therefore, as described above, the data recovery circuit and method according to the present invention performs non-integer times oversampling so that the clock frequency of a phase-locked loop for recovering data having the same frequency is set at a lower level and therefore power consumption is minimized.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
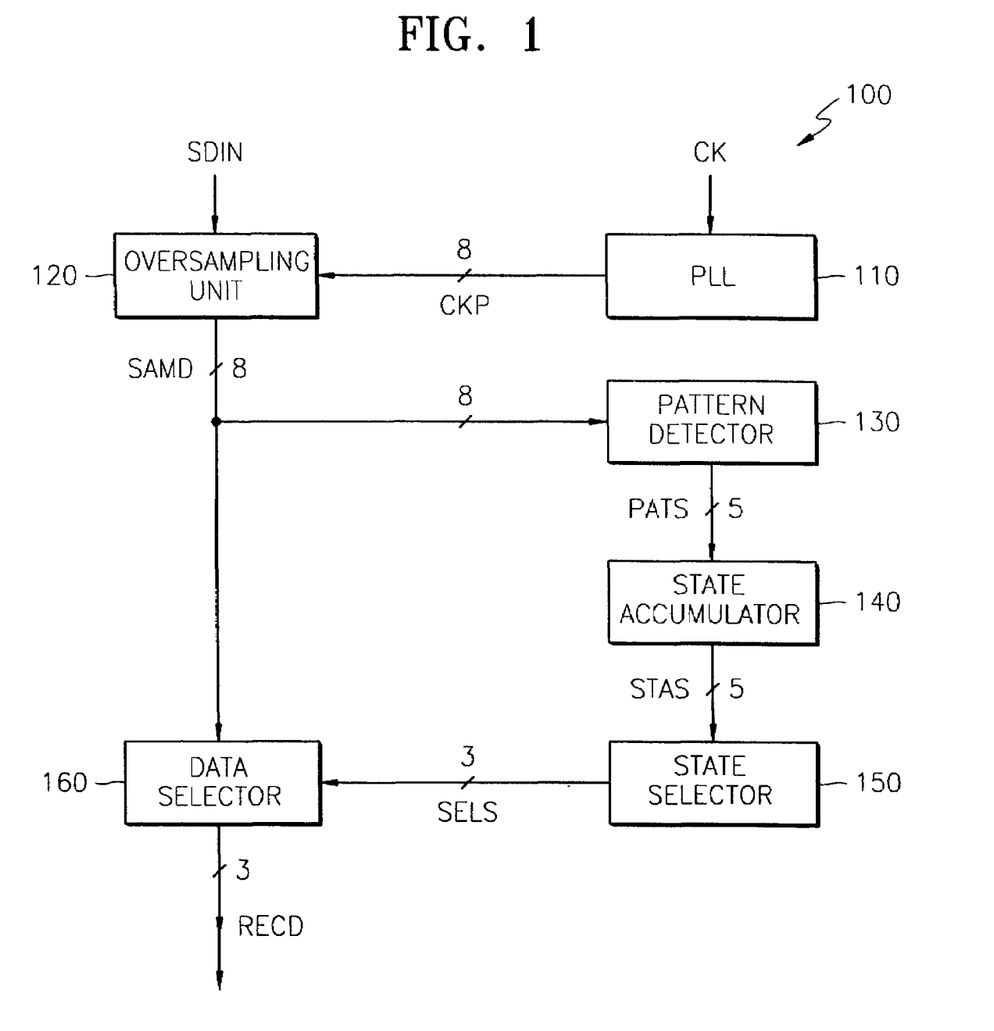
FIG. 1 is a block diagram of a data recovery circuit according to a preferred embodiment of the present invention.

Referring to FIG. 1, a data recovery circuit 100 according to a preferred embodiment of the present invention includes a phase-locked loop 110, an oversampling unit 120, a pattern detector 130, a state accumulator 140, a state selector 150, and a data selector 160.

The phase-locked loop 110 generates a plurality of clock signals (CKP) having different delay times. In the circuit of FIG. 1, the clock signals have 8 different delay times. The clock signals (CKP) are applied to the oversampling unit 120 in parallel and are used as sampling clock signals.

Figure 2:
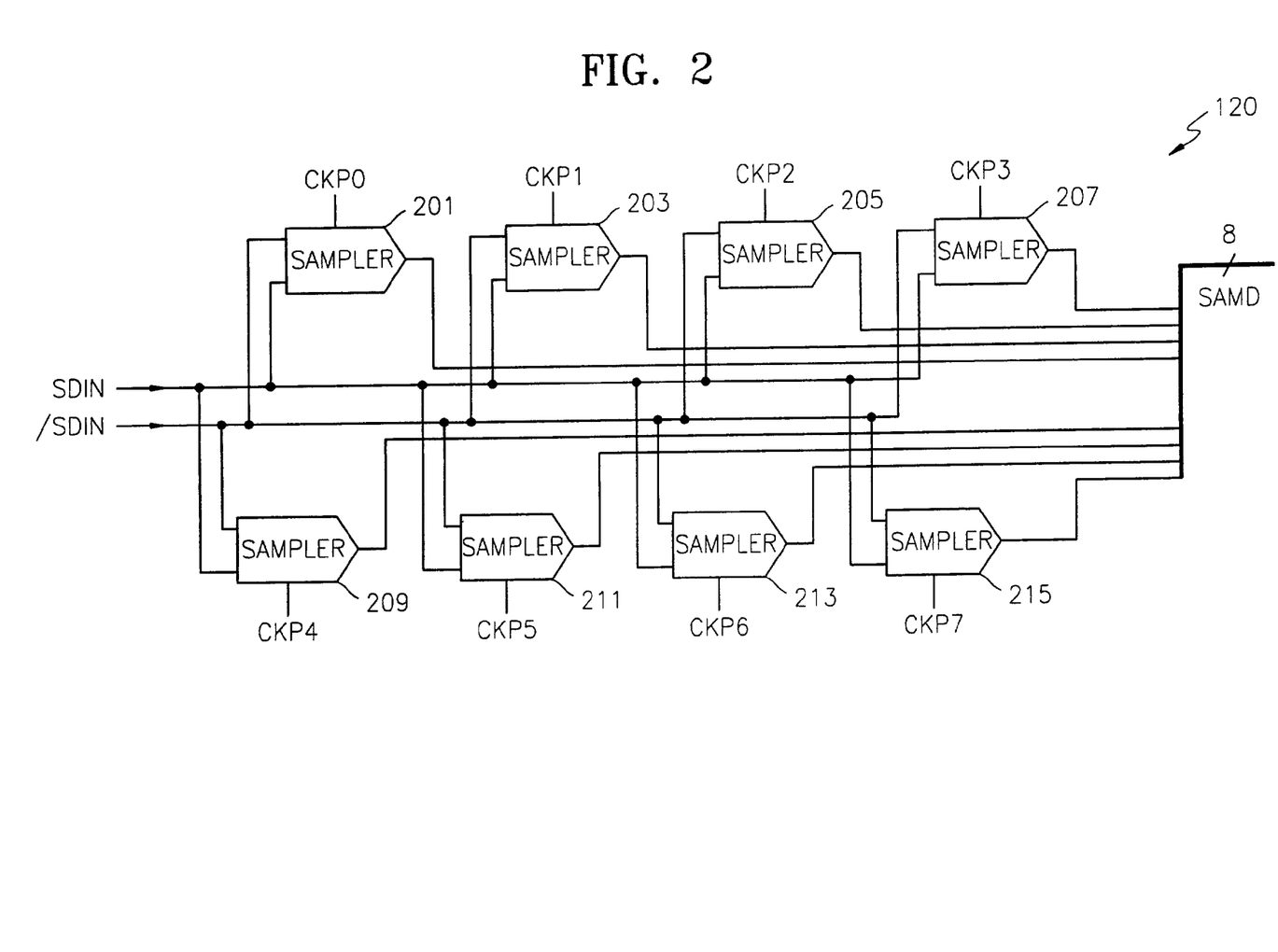
FIG. 2 is a block diagram illustrating an oversampling unit of FIG. 1.

In response to the plurality of clock signals (CKP), the oversampling unit 120 non-integer times oversamples serial data input from the outside (SDIN), and generates the oversampling result as sample data (SAMD) having a plurality of bits. Here, the serial data (SDIN) is a 3 bits long signal input from the outside. That is, the oversampling unit 120 eight times samples the 3 bits long serial data and outputs the oversampled result as 8 bits long sample data. As the oversampling unit 120 2.7 times samples each one bit long section of the input signal, the oversampling unit 120 is characterized by non-integer times sampling. When the serial data input (SDIN) is oversampled in response to the 8 clock signals (CKP), each bit of the 8-bit sample data indicates one of five sampling cases classified with respect to the degree of skew of clock signals. In the preferred embodiment of the present invention, a plurality of sampling cases are classified into five cases. Hereinafter, the preferred embodiment of the present invention will now be described referring to the five sampling cases. The structure of the oversampling unit 120 will be described in detail when FIG. 2 is described.

The pattern detector 130 receives 8 bits long sample data output from the oversampling unit 120, detects level transitions between bits of the sample data, and generates a 5 bits long pattern signal (PATS). When sample data (SAMD) is the result of 2.7 times oversampling serial data (SDIN), the 5 bits pattern signal (PATS) detects which sampling case the oversampling result corresponds to, out of the five sampling cases that can occur, by skew of clock signals (CKP).

The state accumulator 140 receives the 5 bits long pattern signal (PATS) output from the pattern detector 130 and generates a 5 bits long state signal (STAS). Among pattern signals (PATS), the pattern signal having the highest frequency of occurrence is accumulated and output as the 5 bits long state signal (STAS).

The state selector 150 receives the 5 bits long state signal (STAS) and generates a state selection signal having a plurality of bits, for selecting bits of predetermined positions in sample data. The state selection signal may be expressed by a combination of 3 bits.

The data selector 160 receives the sample data (SAMD), selects bits in the sample data (SAMD) which correspond to the state selection signal (SELS), in response to the state selection signal (SELS), and outputs the selected bits as 3-bit recovered data (RECD).

The data recovery circuit 100 according to the present invention, which has the above-described structure, 2.7 times oversamples each one bit section of the input serial data (SDIN), and selects 3 bits out of each 8 bits which are sampled at each level transition of the oversampled sample data (SAMD), to recover data. Therefore, even when skew in an input clock signal occurs, data can be stably recovered, and by non-integer times sampling, the frequency of a clock signal (CKP) of the phase-lock loop 110 can be lowered while still recovering data at the same frequency. Therefore, power consumption can be reduced.

Referring to FIG. 2, the oversampling unit 120 has a plurality of samplers 201 through 215. Each of samplers 201 through 215 receives serial data (SDIN), samples the serial data (SDIN) in response to one of the plurality of clock signals CKP0 through CKP7, and then outputs one bit sample data (SAMD). The oversampling unit 120 shown in FIG. 1 has 8 samplers 201 through 215. Each of samplers 201 through 215 samples serial data (SDIN) and inverted serial data (/SDIN) in response to a clock signal (CKP) and outputs sample data (SAMD). Therefore, sample data (SAMD) becomes 8 bits.

Figure 3:
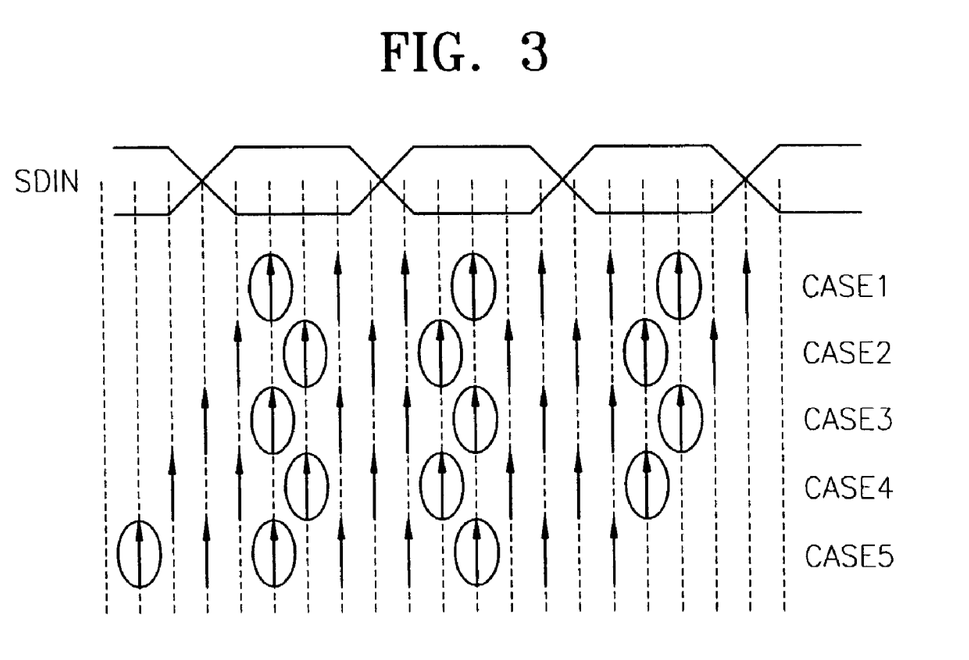
FIG. 3 is a diagram showing five sampling cases classified with respect to the degree of skew of clock signals.

Referring to FIG. 3, when 3 bits long serial data (SDIN) is sampled in response to 8 clock signals (CKP) generated in the phase-locked loop 110, sampling cases can be classified into five cases with respect to skew of clock signals (CKP).

In FIG. 3, clock signals (CKP) performing oversampling are marked by arrows. Among them, an arrow in a circle indicates a case where serial data (SDIN) is actually sampled effectively, and an arrow without a circle indicates a case where serial data (SDIN) is sampled close to a point of level transition and the rate of error occurrence is high.

A first case (CASE 1) indicates a case where the serial data (SDIN) is ahead of the phase of a clock signal (CKP), a fifth case (CASE 5) indicates a case where the serial data (SDIN) is behind the phase of a clock signal (CKP), and a third case (CASE3) indicates a case where the serial data (SDIN) is the same as the phase of a clock signal (CKP).

When data is recovered, in order to remove errors due to skew it is determined which sampling case each bit of sample data (SAMD) corresponds to, out of the five sampling cases shown in FIG. 3. Then, effective sample data bits (corresponding to circled arrows) out of each case of data samples should be output.

If the sample data bits correspond to the first case (CASE 1), sampled data is output by the first, fourth, and seventh clock signals (CKP) out of the 8 clock signals (CKP). If the sample data bits correspond to the second case (CASE 2), sampled data is output by the second, fourth, and seventh clock signals (CKP). If the sample data bits correspond to the third case (CASE 3), sampled data is output by the second, fifth, and eighth clock signals (CKP). If the sample data bits correspond to the fourth case (CASE 4), sampled data is output by the third, fifth, and eighth clock signals (CKP). If the sample data bits correspond to the fifth case (CASE 5), sampled data is output by the first, third, and sixth clock signals (CKP).

Figure 4:
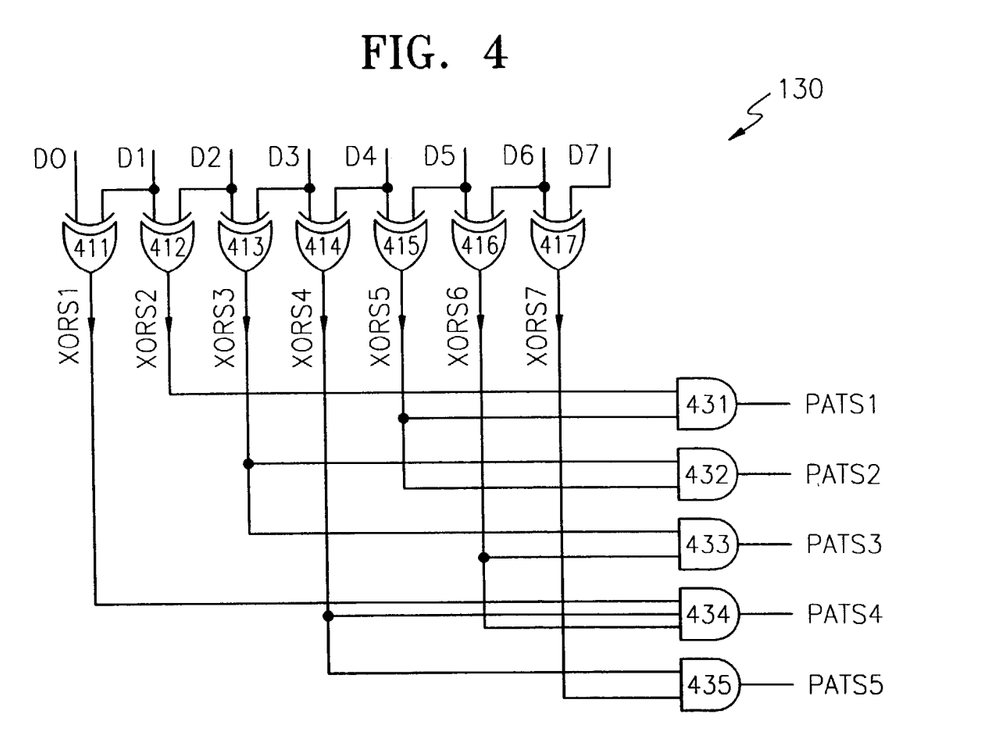
FIG. 4 is a circuit diagram illustrating a pattern detector of FIG. 1.

Referring to FIG. 4, the pattern detector 130 has XOR means 411 through 417 and AND means 431 through 435. The XOR means 411 through 417 receive sample data (SAMD) output from the oversampling unit 120, and detect level transitions between neighboring bits. For this, XOR means 411 through 417 generate pattern detection signals (XORS1~XORS7), by XORing each two neighboring bits in 8-bit sample data (SAMD). Here, bits of the 8-bit sample data are denoted by D0 through D7.

AND means 431 through 435 output first through fifth pattern signals (PATS1~PATS5) by ANDing pattern detection signals (XORS1~XORS7), each of which is generated by bits of the sample data which are not generated at the same time.

Referring to FIG. 4, the operation of the pattern detector 130 will now be described in detail.

XOR means 411 generates a first pattern detection signal (XORS1) by XORing the first bit (D0) and the second bit (D1) of the sample data (SAMD). That is, the first pattern detection signal (XORS1) is the result of sensing a level transition between the first bit (D0) and the second bit (D1) of the sample data (SAMD). If the output of XOR means 411 is at the logic "high" level, it is determined that a level transition exists. Also, XOR means 412 generates a second pattern detection signal (XORS2) by XORing the second bit (D1) and the third bit (D2) of the sample data (SAMD). That is, the second pattern detection signal (XORS2) is the result of sensing a level transition between the second bit (D1) and the third bit (D2) of the sample data (SAMD). Also, XOR means 413 generates a third pattern detection signal (XORS3) by XORing the third bit (D2) and the fourth bit (D3) of the sample data (SAMD). That is, the third pattern detection signal (XORS3) is the result of sensing a level transition between the third bit (D2) and the fourth bit (D3) of the sample data (SAMD).

In this manner, XOR means 411 through 417 generate the first through the seventh pattern signals (XORS1~XORS7) by XORing each two neighboring bits of the sample data (SAMD).

Referring to FIG. 4, AND means 431 through 435 output first through fifth pattern signals (PATS1~PATS5) by ANDing two or three pattern detection signals out of the first through seventh pattern signals (XORS1~XORS7), where the two or three pattern detection signals are generated from sample data bits which are not generated at the same time.

More specifically, AND means 431 generates a first pattern signal (PATS1) by ANDing the second pattern detection signal (XORS2) and the fifth pattern detection signal (XORS5).

AND means 432 generates a second pattern signal (PATS2) by ANDing the third pattern detection signal (XORS3) and the fifth pattern detection signal (XORS5).

AND means 433 generates a third pattern signal (PATS3) by ANDing the third pattern detection signal (XORS3) and the sixth pattern detection signal (XORS6).

AND means 434 generates a fourth pattern signal (PATS4) by ANDing the first pattern detection signal (XORS1), the fourth pattern detection signal (XORS4) and the sixth pattern detection signal (XORS6).

AND means 435 generates a fifth pattern signal (PATS5) by ANDing the fourth pattern detection signal (XORS4) and the seventh pattern detection signal (XORS7).

Here, the first through the fifth pattern signals (PATS1~PATS5) are signals for detecting which case out of the five sampling cases (CASE1~CASE5) each of the sample data bits corresponds to. If one of the first through the fifth pattern signals (PATS1~PATS5) is output at a logic "high" level, it is recognized that the corresponding sampling case is detected. Depending on the structure of the circuit, if one of the first through the fifth pattern signals (PATS1~PATS5) is output at a logic "low" level, it may be recognized that the corresponding sampling case is detected.

Figure 5:
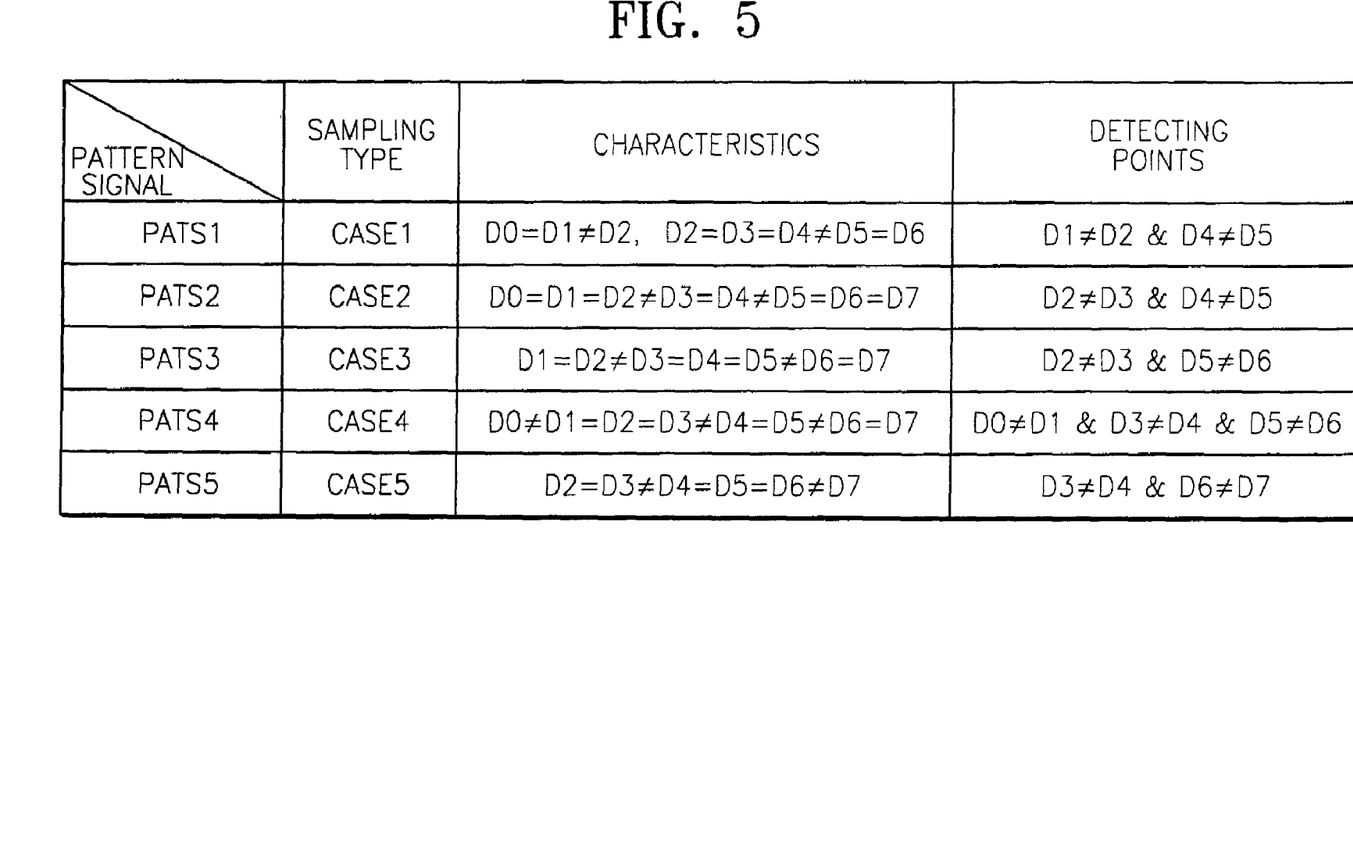
FIG. 5 is a table illustrating detection characteristics of the pattern detector of FIG. 4.

Referring to FIGS. 3 through 5, the operation of the pattern detector 130 will now be described in detail.

The third sampling case (CASE3) will be described as an example. The first bit (D0) of the sample data is sampled at a point when serial data is in transition, so it is not determined whether the data value is recognized as a logic "low" level or a logic "high" level. The data value of the second bit (D1) and the data value of the third bit (D2) are the same, so the second pattern detection signal (XORS2), which is the output of XOR means 412, is at the logic "low" level. Likewise, the third bit (D2) and the fourth bit (D3) have different logic levels, so the third pattern detection signal (XORS3), which is the output of XOR means 413, is at the logic "high" level.

In this manner, the fourth pattern detection signal (XORS4), the fifth pattern detection signal (XORS5), and the seventh pattern detection signal (XORS7) are at the logic "low" level, while the sixth pattern detection signal (XORS6) is at the logic "high" level.

AND means 431 ANDs the second pattern detection signal (XORS2) and the fifth pattern detection signal (XORS5) and outputs the first pattern signal (PATS1) at the logic "low" level. AND means 432 ANDs the third pattern detection signal (XORS3) and the fifth pattern detection signal (XORS5) and outputs the second pattern signal (PATS2) at the logic "low" level. AND means 433 ANDs the third pattern detection signal (XORS3) and the sixth pattern detection signal (XORS6) and outputs the third pattern signal (PATS3) at the logic "high" level. AND means 434 ANDs the first pattern detection signal (XORS1), the fourth pattern detection signal (XORS4) and the sixth pattern detection signal (XORS6) and outputs the fourth pattern signal (PATS4) at the logic "low" level. AND means 435 ANDs the fourth pattern detection signal (XORS4) and the seventh pattern detection signal (XORS7) and outputs the fifth pattern signal (PATS5) at the logic "low" level.

Therefore, among the first through fifth pattern signals (PATS1~PATS5), only the third pattern signal (PATS3) is at the logic "high" level and this corresponds to the third case (CASE3) out of the five sampling cases (CASE1~CASE5). By detecting pattern signals (PATS) having the logic "high" level in this manner, it is detected which sampling case each sample data bit corresponds to.

FIG. 5 shows pattern signals (PATS), sampling cases (CASE1~CASE5) corresponding to the pattern signals, and characteristics of sample data bits corresponding to each sampling case (CASE1~CASE5). Detecting points show sample data bits where data value changes with respect to each sampling case (CASE1~CASE5). The pattern detector 130 detects the bits where data value changes.

Figure 6:
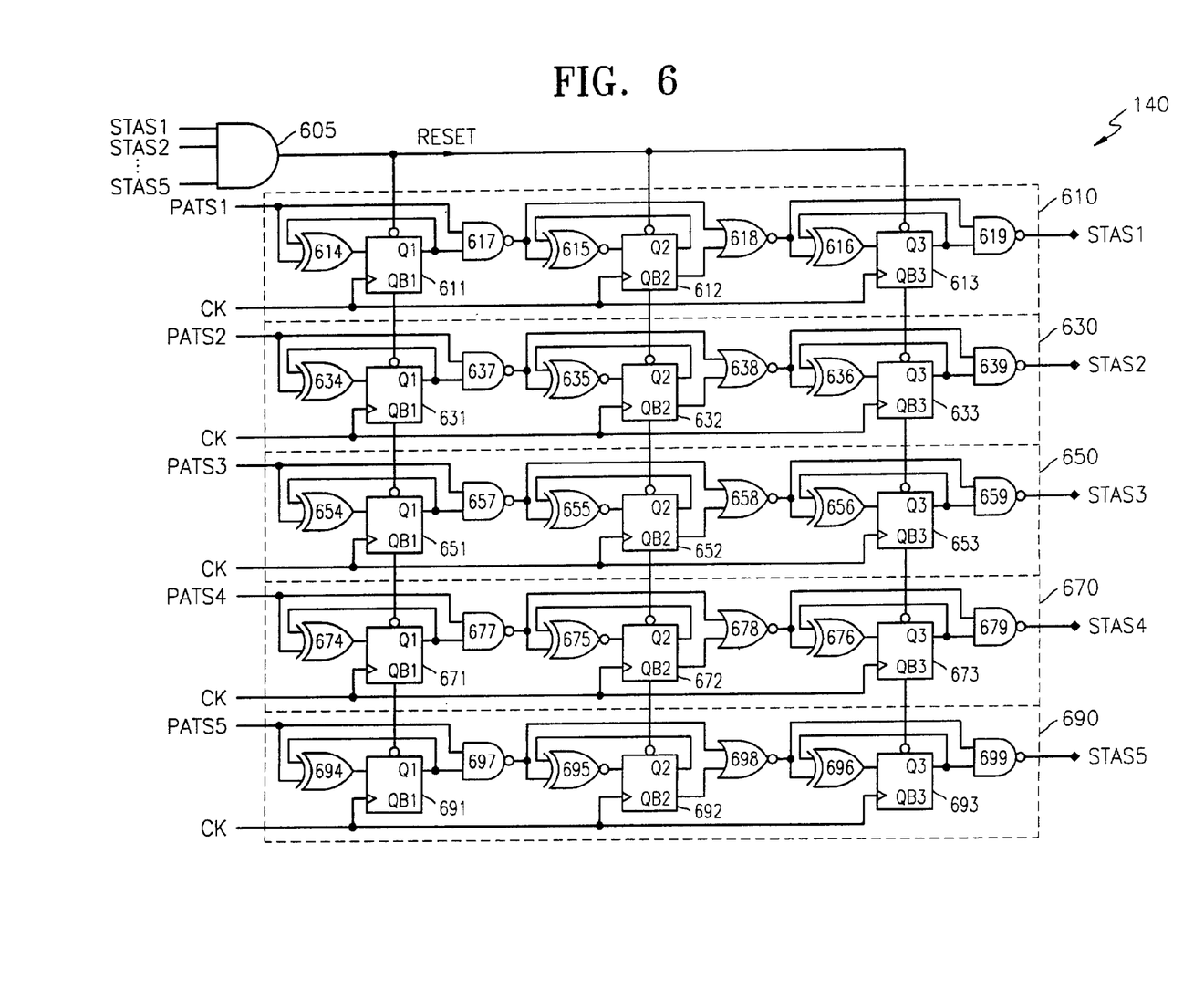
FIG. 6 is a circuit diagram of a state accumulator of FIG. 1.

Referring to FIG. 6, the state accumulator 140 includes a first through a fifth accumulator 610 through 690 and an AND means 605 for generating a reset signal (RESET) for resetting the first through fifth accumulators 610 through 690.

The first accumulator 610 receives and accumulates the first pattern signal (PATS1) in response to an input clock signal (CK), and if the first pattern signal (PATS1) is accumulated a predetermined number of times, a first state signal (STAS1) is output at the first logic level. Here, the first logic level may be a logic "high" level or a logic "low" level depending on the structure of a circuit. In order to perform the above operation, the first accumulator 610 includes flip-flops 611 through 613, XOR means 614 and 616, X-NOR means 615, NAND gates 617 and 619, and NOR gate 618. The flip-flops 611 through 613 of the first accumulator 610 are reset in response to a reset signal (RESET) generated by AND means 605.

The structure of the first accumulator 610 will now be described. XOR means 614 XORs the first pattern signal (PATS1) and the output signal (Q1) of flip-flop 611. Flip-flop 611 receives the output signal of XOR means 614 and generates an output signal (Q1) in response to the input clock signal (CK). NAND gate 617 ANDs the first pattern signal (PATS1) and the output signal (Q1) of flip-flop 611, inverts the result, and then outputs the inverted result.

X-NOR means 615 X-NORs the output of NAND gate 617 and the output signal Q2 of flip-flop 612. Flip-flop 612 receives the output signal of X-NOR means 615 and generates an inverted output signal QB2 in response to the input clock signal (CK). NOR gate 618 ORs the output of NAND gate 617 and the inverted output signal QB2 of flip-flop 612, inverts the result, and outputs the inverted result.

XOR means 616 XORs the output of NOR gate 618 and the output signal (Q3) of flip-flop 613. Flip-flop 613 receives the output signal of XOR means 616 and generates an output signal (Q3) in response to the input clock signal (CK). NAND gate 619 ANDs the output of NOR gate 618 and the output signal (Q3) of flip-flop 613, inverts the result, and outputs the inverted result as the first state signal (STAS1).

That is, if the first pattern signal (PATS1) is accumulated 7 times using the three flip-flops 611 through 613, the first accumulator 610 outputs the accumulated signal as the first state signal (STAS1). Here, the more times the first pattern signal (PATS1) is accumulated, the better. However, in the present embodiment, the frequency of accumulation is arbitrarily set to 7 times. Therefore, the frequency of accumulation of the first pattern signal (PATS1) for generating the first state signal (STAS1) is not limited to 7 times and may change depending on the method of constructing the circuit for the first accumulator 610.

The structure of each of the second through fifth accumulators 630, 650, 670, and 690 is similar to that of the first accumulator 610. That is, the second accumulator 630 includes flip-flops 631 through 633, XOR means 634 and 636, X-NOR means 635, NAND gates 637 and 639, and NOR gate 638. The third accumulator 650 includes flip-flops 651 through 653, XOR means 654 and 656, X-NOR means 655, NAND gates 657 and 659, and NOR gate 658. The fourth accumulator 670 includes flip-flops 671 through 673, XOR means 674 and 676, X-NOR means 675, NAND gates 677 and 679, and NOR gate 678. The fifth accumulator 690 includes flip-flops 691 through 693, XOR means 694 and 696, X-NOR means 695, NAND gates 697 and 699, and NOR gate 698.

The second through the fifth accumulators 630 through 690 receive the second through the fifth pattern signals (PATS2~PATS5), respectively, and output accumulated output signals, the second through the fifth state signals (STAS2~STAS5), respectively. Otherwise, the operation of the six accumulators 610 through 690 are the same, and therefore description of the remaining accumulators 630 through 690 will be omitted to avoid repetition.

AND means 605 ANDs the first through the fifth state signals (STAS1~STAS5) and outputs a reset signal (RESET). That is, the reset signal (RESET) is output if any one of the first through the fifth pattern signals (PATS1~PATS5) is generated at the first logic level. That is, if any one of the first through the fifth pattern signals (PATS1~PATS5) is accumulated seven times and any one of the first through the fifth state signals (STAS1~STA5) is generated, the first through the fifth state signals (STAS1~STAS5) are all reset.

Figure 7:
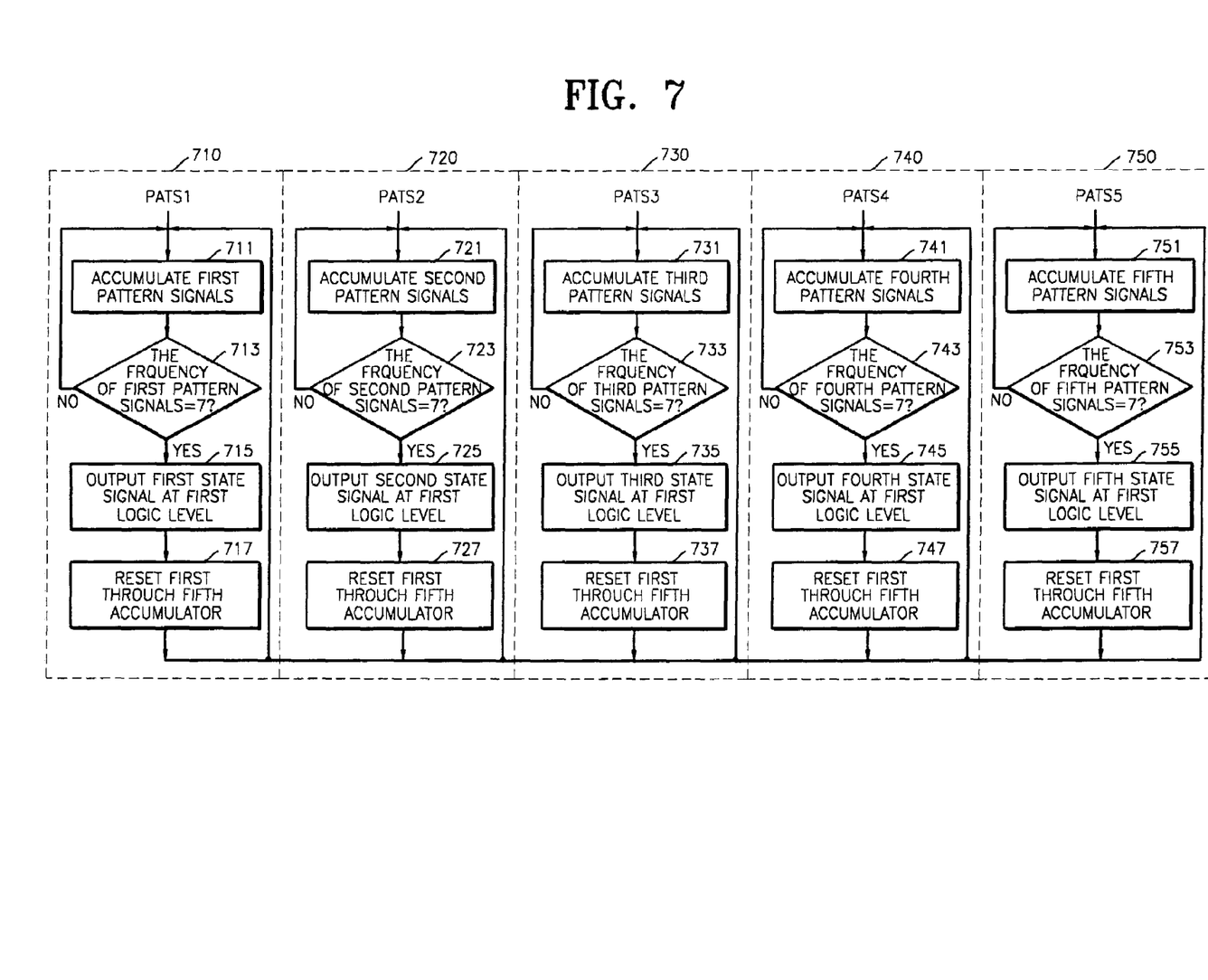
FIG. 7 is a flowchart illustrating the operation of the state accumulator of FIG. 6.

Referring to FIG. 7, the operation of the state accumulator 140 includes steps 711 through 717 for generating the first state signal (STAS1), steps 721 through 727 for generating the second state signal (STAS2), steps 731 through 737 for generating the third state signal (STAS3), steps 741 through 747 for generating the fourth state signal (STAS4), and steps 751 through 757 for generating the fifth state signal (STAS5).

Referring to FIGS. 6 and 7, the operation of the state accumulator 140 will now be described in detail. The steps for generating the first state signal (STAS1) will be described first.

It is assumed that each of the flip-flops 611 through 613 of the first accumulator 610 is initialized to the logic "low" level. The first accumulator 610 accumulates the first pattern signals (PATS1), each of which is input in response to the input clock signal (CK), in step 711. If the first pattern signal (PATS1) at the logic "high" level is applied to the first accumulator 610 shown in FIG. 6, XOR means 614 outputs a logic "high" level signal to flip-flop 611. At this time, in response to the input clock signal (CK), flip-flop 611 generates a logic "high" level output signal (Q1). Also, NAND gate 617 ANDs the first pattern signal (PATS1) and the output signal (Q1) of flip-flop 611, inverts the result, and generates a logic "low" level output signal. X-NOR means 615 outputs a logic "high" level signal to flip-flop 612. Therefore, in response to the input clock signal (CK), flip-flop 612 generates a logic "high" level output signal (Q2). NOR gate 618 ORs the output signal of NAND gate 617 and the inverted output signal (QB2) of flip-flop 612, inverts the result, and generates a logic "high" level output signal. XOR means 616 outputs a logic "high" level signal to flip-flop 613. Therefore, in response to the input clock signal (CK), flip-flop 613 generates a logic "high" level output signal (Q3). NAND gate 619 ANDs the output of NOR gate 618 and the output signal (Q3) of flip-flop 613, inverts the result, and outputs a logic "low" level signal as the first state signal (STAS1). If the first pattern signal (PATS1) is input at the logic "low" level, the first state signal (STAS1) is output at the logic "high" level.

Referring to FIG. 7, it is determined whether or not the frequency of occurrence of the first pattern signal (PATS1) is 7 times in step 713. For this, it is determined whether or not the first state signal (STAS1) is generated. Also, the frequency of occurrence may be determined differently depending on the circuit structure. Referring to FIG. 7, if the first pattern signal (PATS11) at the logic "high" level is generated 7 times, the first state signal (STAS1) is output at the logic "low" level in step 715, and a reset signal (RESET) resets the first through the fifth accumulators 610 through 690 in step 717.

The operation of generating the second state signal (STAS2) is similar to that of the first state signal (STAS1). That is, if it is determined that the frequency of occurrence of the second pattern signal (PATS2) is 7 times, the second state signal (STAS2) is generated and the first through the fifth accumulators 610 through 690 are reset in step 727. The same steps are applied for the third through fifth state signals (STAS3~STAS5), and therefore detailed descriptions will be omitted to avoid repetition.

If any one of the first through the fifth pattern signals (PATS1 PATS5), which are input to the first through the fifth accumulators 610 through 690, respectively, is first accumulated 7 times at the logic "high" level, the corresponding state signal (STAS) is generated at the logic "low" level.

Also, if the state signal (STAS) is generated, a reset signal (RESET) is changed to the logic "low" level and each of the accumulators 610 through 690 is reset and made ready for receiving a new signal.

Since one of the first through fifth pattern signals (PATS1~PATS5) at the logic "high" level corresponds to one of the five sampling cases (CASE1~CASE5), the generation of a logic "low" level state signal (STAS) after a logic "high" level pattern signal (PATS) is accumulated 7 times means that the accumulator 140 determines the sampling case having the highest frequency among the five sampling cases (CASE1~CASE5) and outputs the sampling case.

Figure 8:
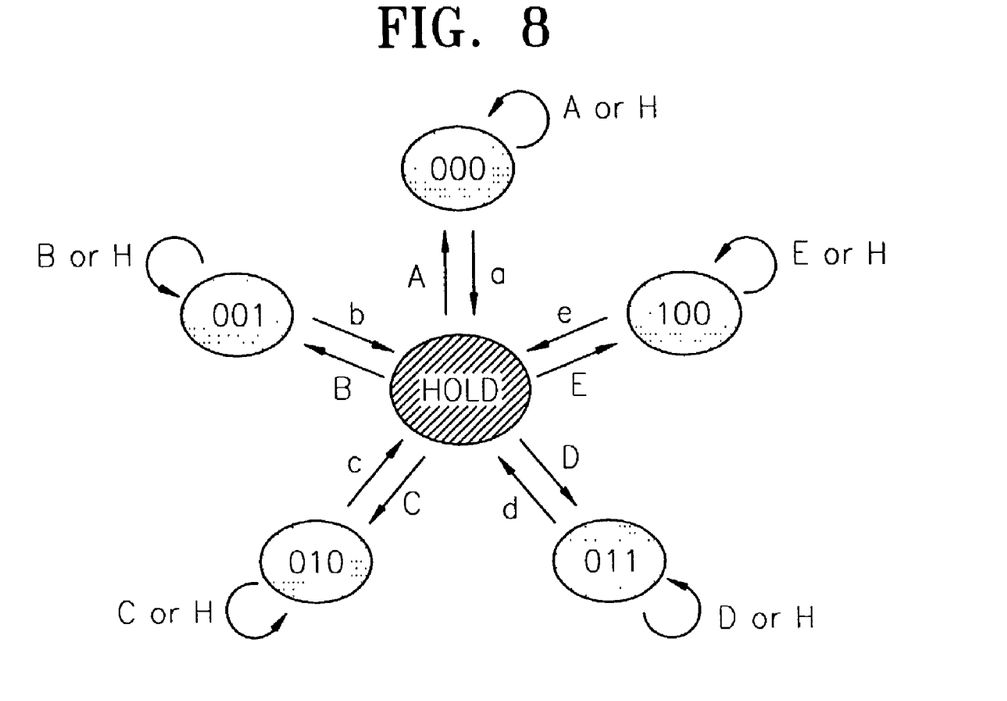
FIG. 8 is a state diagram illustrating the operation of a state selector of FIG. 1.

Referring to FIG. 8, the state selector 150 receives the first through the fifth state signals (STAS1~STAS5), and generates a state selection signal (SELS) having a plurality of bits for selecting bits at predetermined positions in sample data. That is, if a state signal (STAS) generated in the state accumulator 140 is different from the previous state signal, the state selector 150 generates a state selection signal (SELS) by determining the continuity of the state signals.

For this, if only one of the first through fifth state signals (STAS1~STAS5) is generated at the first logic level, the state selector 150 sets 3-bit data as a state selection signal (SELS). Then, if a state signal (STAS) different from the previous state signal (STAS) is generated once at the first logic level, the state selector 150 sets a predetermined intermediate signal (HOLD) for representing the state. Therefore, the state selector 150 sets six cases of states. That is, each of five states in the six states is formed of 3-bit data and the remaining one state is an intermediate state (HOLD) for indicating a process in which a state signal (STAS) input to the state selector 150 is in transit.

If a state signal (STAS) corresponds to the intermediate state (HOLD), 3-bit data corresponding to the previous state signal (STAS) is set as a state selection signal (SELS), and according to the next state signal the state selection signal (SELS) may be changed to data having the previous 3 bits corresponding to the previous state signal (STAS), or different 3 bits corresponding to the next state signal which is input to the state selector 150. That is, the intermediate state (HOLD) performs as a channel between the remaining 5 states, each of which has 3-bit data, and at the same time functions as a filter.

If a state signal (STAS) different from the previous state signal (STAS) is generated once at the first logic level, 3-bit data corresponding to the previous state signal (STAS) is output as the state selection signal (SELS). If a state signal (STAS) different from the previous state signal (STAS) is generated once again at the first logic level, 3-bit data corresponding to the new state signal (STAS) is output as the state selection signal (SELS). Here, the first logic level may be a logic "high" level or a logic "low" level according to the structure of the state selector 150.

More specifically, referring to FIG. 8, if the first state signal (STAS1) is generated at the first logic level, the state selection signal (SELS) is set to "000". If the second state signal (STAS2) is generated at the first logic level, the state selection signal (SELS) is set to "001". If the third state signal (STAS3) is generated at the first logic level, the state selection signal (SELS) is set to "010". If the fourth state signal (STAS4) is generated at the first logic level, the state selection signal (SELS) is set to "011". If the fifth state signal (STAS5) is generated at the first logic level, the state selection signal (SELS) is set to "100". Here, the first logic levels are all the logic "low" level.

In FIG. 8, A through E and a through e denote transition paths between states. That is, A denotes a transition path when the first state signal (STAS1) is at the logic "low" level and the remaining second through fifth state signals (STAS2~STAS5) are at the logic "high" level. Likewise, B denotes a transition path when the second state signal (STAS2) is at the logic "low" level and the first and third through fifth state signals (STAS1, STAS3~STAS5) are at the logic "high" level. C denotes a transition path when the third state signal (STAS3) is at the logic "low" level and the first, second, fourth, and fifth state signals (STAS1, STAS2, STAS4, and STAS5) are at the logic "high" level. D denotes a transition path when the fourth state signal (STAS4) is at the logic "low" level and the first through third and fifth state signals (STAS1~STAS3, STAS5) are at the logic "high" level. E denotes a transition path when the fifth state signal (STAS5) is at the logic "low" level and the first through fourth state signals (STAS1~STAS4) are at the logic "high" level.

Letter a denotes a transition path when only the first state signal (STAS1) is at the logic "low" level, that is, when after the state selection signal (SELS) is set to "000", a state signal (STAS) different from the previous state signal is generated once. Letter b denotes a transition path when only the second state signal (STAS2) is at the logic "low" level, that is, when after the state selection signal (SELS) is set to "001", a state signal (STAS) different from the previous state signal is generated once. Letter c denotes a transition path when only the third state signal (STAS3) is at the logic "low" level, that is, when after the state selection signal (SELS) is set to "010", a state signal (STAS) different from the previous state signal is generated once. Letter d denotes a transition path when only the fourth state signal (STAS4) is at the logic "low" level, that is, when after the state selection signal (SELS) is set to "011", a state signal (STAS) different from the previous state signal is generated once. Letter e denotes a transition path when only the fifth state signal (STAS5) is at the logic "low" level, that is, when after the state selection signal (SELS) is set to "100", a state signal (STAS) different from the previous state signal is generated once. H denotes a transition path when the first through fifth state signals (STAS1~STAS5) are all at the logic "high" level.

Referring to FIG. 8, consider the case in which the first state signal (STAS1) is at the logic "low" level and the remaining state signals (STAS2~STAS5) are all at the logic "high" level, corresponding to a state in which the state selection signal (SELS) is set to "000". If a state signal (STAS) corresponding to a state in which only the second state signal (STAS2) is at the logic "low" level and the remaining state signals (STAS1, STAS3~STAS5) are at the logic "high" level is input to the state selector 150, the state of the state selector 150 is set to an intermediate state (HOLD) through path "a". However, also in this case, the state selection signal (SELS) is set to "000" corresponding to the previous state, and output.

If a state signal (STAS) corresponding to the state in which only the second state signal (STAS2) is at the logic "low" level and the remaining state signals (STAS1, STAS3~STAS5) are at the logic "high" level is input once again to the state selector 150, the state of the state selector 150 is moved to a state in which the state selection signal (SELS) is set to "001". Therefore, "001" is output as the state selection signal (SELS).

Figure 9:
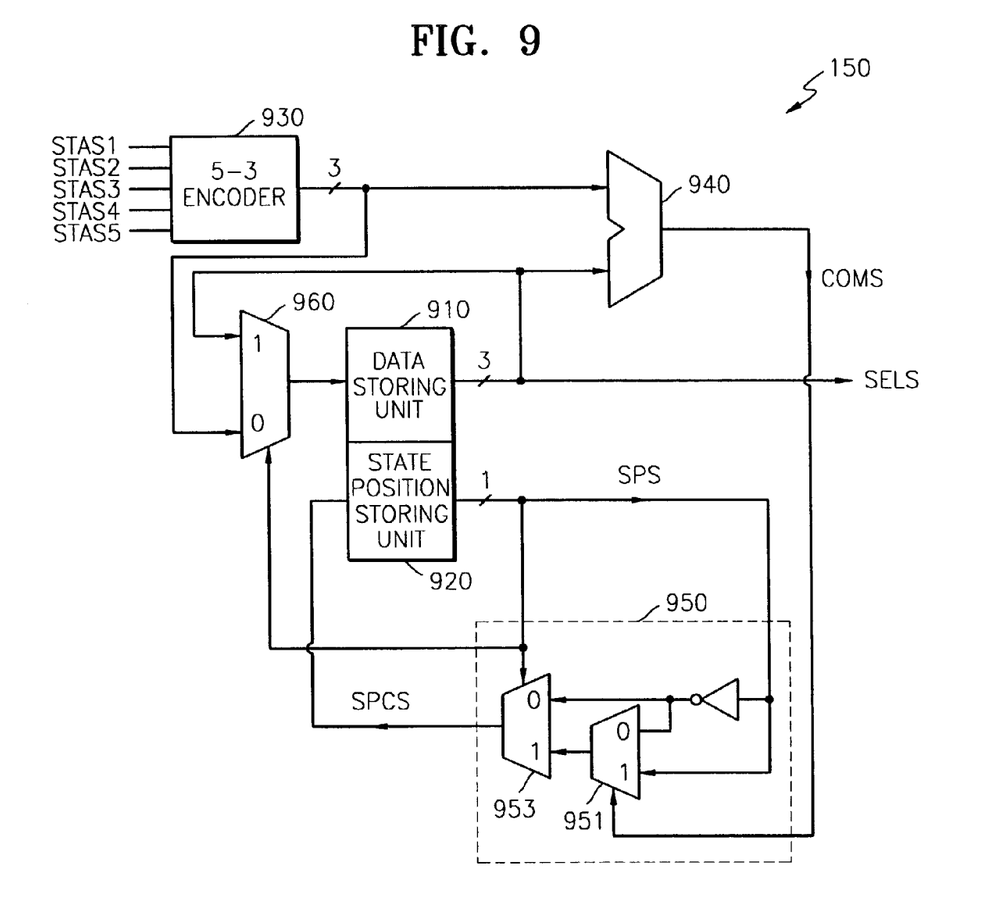
FIG. 9 is a block diagram of the state selector of FIG. 1.

Referring to FIG. 9, the state selector 150 includes a data storing unit 910, a state position storing unit 920, an encoding means 930, a comparing means 940, a control unit 950, and a selecting means 960.

The data storing unit 910 receives and stores 3-bit data corresponding to the current state signal (STAS) and outputs the 3-bit data as the state selection signal (SELS). The state position storing unit 920 generates a state position signal (SPS) indicating a predetermined intermediate state (HOLD). Here, the data storing unit 910 and the state position storing unit 920 may be flip-flops. Also, either a logic "high" level or a logic "low" level of the state position signal (SPS) may indicate the intermediate state (HOLD), depending on the method of constructing the state selection unit 150.

The encoding means 930 receives a new state signal (STAS) and generates 3-bit data. The comparing means 940 generates a comparison signal (COMS) by comparing 3-bit data generated in the encoding means 930 and 3-bit data output from the data storing unit 910.

The control unit 950 generates a state position control signal (SPCS) for controlling the state position storing unit 920 in response to the state position signal (SPS) and the comparison signal (COMS). The selecting means 960, in response to the state position signal (SPS), selects either 3-bit data generated by the encoding means 930 or 3-bit data output from the data storing unit 910, and outputs the selected one to the storing unit 910.

Preferably, the control unit 950 includes a first selecting means 951 for selecting either the state position signal (SPS) or a signal obtained by inverting the state position signal (SPS), in response to the comparison signal (COMS), and a second selecting means 953 for selecting either the output signal of the first selecting means 951 or the inverted state position signal (SPS), in response to the state position signal (SPS). Here, the selecting means 960, the first selecting means 951, and the second selecting means 953 may be multiplexers.

Referring to FIG. 9, the operation of the state selecting unit 150 will now be described.

The state position signal (SPS) generated in the state position storing unit 920 is at the logic "low" level when the state of the state selector 150 is an intermediate state (HOLD) out of the six states, and is at the logic "high" level when the state of the state selector 150 is in any one of the remaining five states. The logic level of the state position signal (SPS) may be changed depending on the method of constructing the circuit of the state selector 150.

It is assumed that "000" is stored as 3-bit data corresponding to the current state signal (STAS) in the data storing unit 910. Then, the state position signal (SPS) is at the logic "high" level and the state selection signal (SELS) is output as "000". At this time, if a state signal corresponding to a state where only the second state signal (STAS2) is at the logic "low" level and the remaining state signals (STAS1, STAS3~STAS5) are at the logic "high" level is input as a new state signal (STAS) to the encoding means 930, the encoding means 930 outputs "001" as 3-bit data. The comparing means 940 receives and compares the 3-bit data output from the encoding means 930 and the 3-bit data in the data storing unit 910. If two 3-bit data outputs are the same, the comparing means 940 outputs the comparison signal (COMS) at the logic "high" level. In the present embodiment, the comparison signal is output at the logic "low" level, but the inverse may also be used.

The control unit 950, in response to the state position signal (SPS) and the comparison signal (COMS), generates a state position control signal (SPCS) for controlling the state position storing unit 920. More specifically, in response to the comparison signal (COMS), the first selecting means 951 of the control unit 950 selects either the state position signal (SPS) or the inverted state position signal (SPS), and outputs the selected signal. Since the comparison signal is at the logic "low" level, the first selecting means 951 outputs the inverted state position signal (SPS) which is at the logic "low" level. In response to the state position signal (SPS), the second selecting means 953 selects either the output signal of the first selecting means 951 or the inverted state position signal (SPS), and outputs the selected signal as the state position control signal (SPCS). The state position control signal (SPCS) is at the logic "low" level. Therefore, a logic "low" level signal is input to the state position storing unit 920 and the state position signal (SPS) changes to a logic "low" level. This means that the state of the state selecting unit 150 is in an intermediate state (HOLD).

In response to the state position signal (SPS), the selecting means 960 selects either the 3-bit data generated by the encoding means 930 or the 3-bit data output from the data storing unit 910, and outputs the selected one to the data storing unit 910. Since the state position signal (SPS) before the transition is at the logic "high" level, the selecting means 960 applies the 3-bit data output from the data storing unit 910 to the data storing unit 910. Therefore, the 3-bit data of the data storing unit 910 is "000", which is the previous data value, and outputs "000" as the state selection signal (SELS).

That is, since a state signal (STAS) different from the previous state signal (STAS) is input once, the state selection signal (SELS) output from the state selecting unit 150 does not change but the state of the state selector 150 changes to the intermediate state (HOLD).

If a new state signal (STAS) input to the state selector 150 corresponds to a state in which only the second state signal (STAS2) is at the logic "low" level and the remaining state signals (STAS1, STAS3~STAS5) are at the logic "high" level, then, the encoding means 930 again outputs "001" as 3-bit data. Since the 3-bit data output by the encoding means 930 is not the same as the 3-bit data of the data storing unit 910, the comparing means 940 outputs the comparison signal (COMS) at the logic "low" level.

In response to the comparison signal (COMS), the first selecting means 951 of the control unit 950 selects either the state position signal (SPS) or the inverted state position signal (SPS), and outputs the selected signal. Since the comparison signal (COMS) is at the logic "low" level, the first selecting means 951 outputs the inverted state position signal (SPS) which is at the logic "high" level. In response to the state position signal (SPS), the second selecting means 953 selects either the output signal of the first selecting means 951 or the inverted state position signal (SPS), and outputs the selected signal as the state position control signal (SPCS). Since the state position signal (SPS) is at the logic "low" level, the second selecting means 953 outputs the inverted state position signal (SPS) as the state position control signal (SPCS). The state position control signal (SPCS) is at the logic "high" level. Therefore, a logic "high" level signal is input to the state position storing unit 920 and the state position signal (SPS) is again changed to the logic "high" level. This means that the state of the state selector 150 is changed from the intermediate state (HOLD) to one of the five remaining states, each of which has 3-bit data.

In response to the state position signal (SPS), the selecting means 960 selects either the 3-bit data generated by the encoding means 930 or the 3-bit data output from the data storing unit 910, and outputs the selected one to the data storing unit 910. Since the state position signal (SPS) before transition is at the logic "low" level, the selecting means 960 applies the 3-bit data output from the encoding means 930 to the data storing unit 910. Therefore, the 3-bit data of the data storing unit 910 has a new data value, "001" and "001" is output as the state selection signal (SELS).

That is, since a state signal (STAS) different from the previous state signal is input twice, the state selection signal (SELS) output from the state selecting unit 150 has new 3-bit data and the state of the state selector 150 is changed to one of the states, each of which has 3-bit data.

In this way, if a new state signal (STAS) which is the same as the previous state signal (STAS) is input, the value of the state position signal (SPS) or the state selection signal (SELS) does not change.

Figure 10:
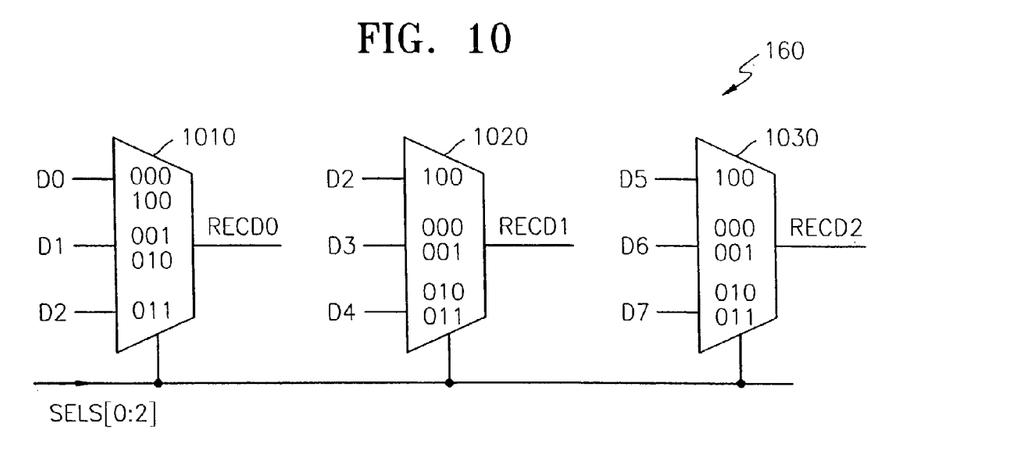
FIG. 10 is a block diagram of a data selector of FIG. 1.

Referring to FIG. 10, the data selector 160 includes a plurality of selecting means 1010 through 1030. Each of the selecting means 1010 through 1030 receives m bits (here, m is a natural number and is not zero) of the sample data. In response to the state selection signal (SELS), each of the selecting means 1010 through 1030 selects one bit of the received m bits of the sample data, and outputs the bit as a recovered data bit (RECD1~RECD3). In the embodiment of the present invention, the selecting means 1010 through 1030 of the state selecting unit 160 are three multiplexers. Also, m-bit sample data (SAMD) which is input to each of selecting means 1010~1030 is formed of 3 bits.

The multiplexer 1010 receives three continuous bits (D0, D1, D2) of the 8-bit sample data output from the oversampling unit 120, and, in response to the state selection signal (SELS), selects one bit and outputs the selected bit as one bit (RECD 0) of the recovered data. The multiplexer 1020 receives three continuous bits (D2, D3, D4), and, in response to the state selection signal (SELS), selects one bit and outputs the selected bit as one bit (RECD 1) of the recovered data. The multiplexer 1030 receives three continuous bits (D5, D6, D7), and, in response to the state selection signal (SELS), selects one bit and outputs the selected bit as one bit (RECD 2) of the recovered data.

Figure 11:
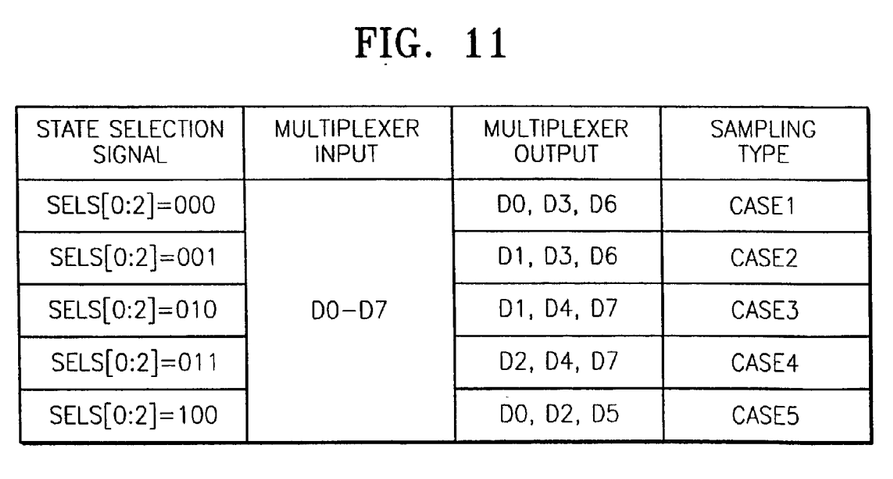
FIG. 11 is a table illustrating the operation of the data selector of FIG. 10.

FIG. 11 is a table illustrating the operation of the data selector of FIG. 10. That is, FIG. 11 shows classified output data of multiplexers corresponding to the state selection signal (SELS).

Referring to FIGS. 10 and 11, the operation of the data selector 160 will now be described in detail.

If the value of the 3-bit state selection signal (SELS) is "000", the multiplexers 1010 through 1030 select and output the first data bit (DO), the fourth data bit (D3), and the seventh data bit (D6) of the sample data (SAMD). The case where the value of the 3-bit state selection signal (SELS) is "000" corresponds to the case where only the first state signal (STAS1) is at the logic "low" level and the remaining state signals (STAS2~STAS5) are at the logic "high" level. In addition, the case corresponds to when the first pattern signal (PATS1) is generated at the logic "high" level, and corresponds to the first case (CASE1) of the five sampling cases (CASE1~CASE5). Referring to FIG. 2, effective bits of sampling data in the first case (CASE1) are the first, the fourth, and the seventh bits, which are shown in FIG. 11.

Likewise, if the value of the 3-bit state selection signal (SELS) is "001", the multiplexers 1010 through 1030 select and output the second data bit (D1), the fourth data bit (D3), and the seventh data bit (D6) of the sample data (SAMD). This corresponds to the second case (CASE2) of the sampling cases (CASE1~CASE5).

In this manner, in response to the state selection signal (SELS), the state selector 160 outputs effective data bits of the sample data (SAMD) as the recovered data (RECD1~RECD2).

As described above, the data recovery circuit and method according to the present invention performs non-integer times oversampling so that the clock frequency of a phase-locked loop for recovering data having the same frequency is set at a lower level and therefore power consumption is minimized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data recovery circuit comprising:
   a phase-locked loop for generating a plurality of clock signals, each of which is synchronized to an input clock signal and has a different delay time;
   an oversampling unit for non-integer times oversampling serial data which is input from the outside, in response to the plurality of clock signals, and outputting the oversampled result as sample data formed of a plurality of bits;
   a pattern detector for receiving the sample data formed of the plurality of bits, and generating a pattern signal formed of a plurality of bits by detecting level transitions between bits of the sample data;
   a state accumulator for receiving the pattern signal formed of the plurality of bits, accumulating the frequency of occurrence of the pattern signal, and outputting the pattern signal having the highest frequency of occurrence as a state signal formed of a plurality of bits if the pattern signal having the highest frequency of occurence is accumulated a predetermined number of times;
   a state selector for receiving the state signal formed of the plurality of bits, and generating a state selection signal formed of a plurality of bits for selecting bits at predetermined positions in the sample data; and
   a data selector for receiving the sample data, selecting bits of the sample data in response to the state selection signal, where the bits correspond to the state selection signal, and outputting the selected bits as recovered data formed of a plurality of bits.

2. The data recovery circuit of claim 1, wherein the oversampling unit comprises:
   a plurality of sampling means, each for receiving the serial data, sampling the serial data in response to each of the plurality of clock signals, and outputting one bit of the sample data.

3. The data recovery circuit of claim 2, wherein the oversampling unit has 8 sampling means.

4. The data recovery circuit of claim 2, wherein each sampling means samples the serial data and the serial data inverted, in response to the clock signal.

5. The data recovery circuit of claim 1, wherein the oversampling unit 2.7 times oversamples each one bit section of the input serial data.

6. The data recovery circuit of claim 1, wherein when the input serial data is sampled in response to the plurality of clock signals, each bit of the sample data formed of the plurality of bits indicates one of a plurality of sampling cases which are classified with respect to the degree of skew of clock signals.

7. The data recovery circuit of claim 1, wherein the pattern detector comprises:
   XOR means for XORing each two neighboring bits of the sample data formed of the plurality of bits, and outputting the result as a pattern detection signal formed of a plurality of bits; and
   AND means for ANDing bits of the pattern detection signal formed of the plurality of bits, each of which is generated by bits of the sample data which are not generated at the same time, and outputting the result as first through fifth pattern signals.

8. The data recovery circuit of claim 7, wherein the first through the fifth pattern signals indicate which sampling case out of the plurality of sampling cases each bit of the sample data corresponds to, and each of which indicates one of the plurality of sampling cases which are classified with respect to the degree of skew of clock signals, when the input serial data is sampled in response to the plurality of clock signals.

9. The data recovery circuit of claim 1, wherein the state accumulator comprises:
   a plurality of accumulators, each of which accumulates one of the plurality of the pattern signals in response to the input clock signal, and outputs one of the state signals at a first logic level if the pattern signal is accumulated the predetermined number of times; and
   an AND means for ANDing the state signals and generating a reset signal for resetting the plurality of accumulators.

10. The data recovery circuit of claim 9, wherein the state accumulator comprises:
    a first accumulator for receiving and accumulating the first pattern signal in response to the input clock signal, and outputting a first state signal at the first logic level if the first pattern signal is accumulated the predetermined number of times;
    a second accumulator for receiving and accumulating the second pattern signal in response to the input clock signal, and outputting a second state signal at the first logic level if the second pattern signal is accumulated the predetermined number of times;
    a third accumulator for receiving and accumulating the third pattern signal in response to the input clock signal, and outputting a third state signal at the first logic level if the third pattern signal is accumulated the predetermined number of times;
    a fourth accumulator for receiving and accumulating the fourth pattern signal in response to the input clock signal, and outputting a fourth state signal at the first logic level if the fourth pattern signal is accumulated the predetermined number of times;
    a fifth accumulator for receiving and accumulating the fifth pattern signal in response to the input clock signal, and outputting a fifth state signal at the first logic level if the fifth pattern signal is accumulated the predetermined number of times; and
    an AND means for ANDing the first through the fifth state signals and generating a reset signal for resetting the first through the fifth accumulators.

11. The data recovery circuit of claim 10, wherein the state selector sets the state selection signal to 3-bit data if only one of the first through the fifth state signals is generated at the first logic level, sets the state selection signal to 3-bit data corresponding to the previous state signal if a state signal different from the previous state signal is generated once at the first logic level, sets the state selection signal to 3-bit data corresponding to a new state signal if the new state signal different from the previous state signal is generated once again at the first logic level, and if a state signal different from the previous state signal is generated once at the first logic level, sets a predetermined intermediate state to represent the state.

12. The data recovery circuit of claim 11, wherein the state selector sets the state selection signal to "000" if only the first state signal is generated at the first logic level; "001" if only the second state signal is generated at the first logic level; "010" if only the third state signal is generated at the first logic level; "011" if only the fourth state signal is generated at the first logic level; and "100" if only the fifth state signal is generated at the first logic level.

13. The data recovery circuit of claim 12, wherein the state selector comprises:
    a data storing unit for receiving and storing 3-bit data corresponding to the current state signal and outputting the data as the state selection signal;
    a state position storing unit for generating a state position signal indicating the predetermined intermediate state;
    an encoding means for receiving a new state signal and generating 3-bit data;
    a comparing means for comparing 3-bit data generated by the encoding means and 3-bit data output from the data storing unit and generating a comparison signal;
    a control unit for generating a state position control signal for controlling the state position storing unit in response to the state position signal and the comparison signal; and
    a selecting means for selecting either 3-bit data generated by the encoding means or 3-bit data output from the data storing unit, in response to the state position signal, and outputting the selected data to the data storing unit.

14. The data recovery circuit of claim 13, wherein the control unit comprises:
    a first selecting means for selecting one of the state position signal and the state position signal inverted, in response to the comparison signal, and outputting the selected signal; and
    a second selecting means for selecting one of the output signal of the first selecting means and the inverted state position signal, in response to the state position signal, and outputting the selected signal as the state position control signal.

15. The data recovery circuit of claim 1, wherein the data selector comprises:
    a plurality of selecting means for receiving m bits (where m is a natural number and is not zero) of the sample data formed of the plurality of bits, selecting one bit of the received m bits of the sample data in response to the state selection signal, and outputting the selected bit as a recovered data bit.

16. The data recovery circuit of claim 15, wherein the selecting means is a multiplexer.

17. The data recovery circuit of claim 15, wherein the m bits of sample data input to the selecting means are 3 bits of the sample data.

18. The data recovery circuit of claim 15, wherein the data selector has 3 multiplexers.

19. A data recovery method comprising the steps of:
    (a) generating a plurality of clock signals, each of which is synchronized to an input clock signal and has a different delay time;
    (b) non-integer times oversampling serial data which is input from the outside, in response to the plurality of clock signals, and outputting the oversampled result as sample data formed of a plurality of bits;

(c) receiving the sample data formed of the plurality of bits, and generating a pattern signal formed of a plurality of bits by detecting level transition between bits of the sample data;

(d) receiving the pattern signal formed of the plurality of bits, accumulating the frequency of occurrence of the pattern signal, and outputting the pattern signal having the highest frequency of occurrence as a state signal formed of a plurality of bits if the pattern signal having the highest frequency of occurence is accumulated a predetermined number of times;

(e) receiving the state signal formed of the plurality of bits, and generating a state selection signal formed of a plurality of bits for selecting bits at predetermined positions in the sample data; and (f) receiving the sample data, selecting bits of the sample data in response to the state selection signal, where the bits correspond to the state selection signal, and outputting the selected bits as recovered data formed of a plurality of bits.

20. The data recovery method of claim 19, wherein in step (b) each one bit section of the input serial data is 2.7 times oversampled.

21. The data recovery method of claim 19, wherein when the input serial data is sampled in response to the plurality of clock signals, each bit of the sample data formed of the plurality of bits indicates one of a plurality of sampling cases which are classified with respect to the degree of skew of clock signals.

22. The data recovery method of claim 19, wherein step (c) comprises:

(c1) XORing each two neighboring bits of the sample data formed of the plurality of bits, and outputting the result as a pattern detection signal formed of a plurality of bits; and (c2) ANDing bits of the pattern detection signal formed of the plurality of bits, each of which is generated by bits of the sample data which are not generated at the same time, and outputting the result as first through fifth pattern signals.

23. The data recovery method of claim 22, wherein the first through the fifth pattern signals indicate which sampling case out of the plurality of sampling cases each bit of the sample data corresponds to, and each of which indicates one of the plurality of sampling cases which are classified with respect to the degree of skew of clock signals, when the input serial data is sampled in response to the plurality of clock signals.

24. The data recovery method of claim 23, wherein step (d) comprises:

(d1) receiving and accumulating the first through the fifth pattern signals in response to the input clock signal;

(d2) detecting which pattern signal has the highest frequency of occurrence by determining whether each one of the first through the fifth pattern signals is accumulated the predetermined number of times;

(d3) outputting one state signal out of first through fifth state signals as a signal at a first logic level, where the output state signal corresponds to the detected pattern signal having the highest frequency of occurrence; and (d4) performing an initialization operation for receiving new first through fifth pattern signals.

25. The data recovery method of claim 24, wherein in step (e) the state selection signal is set to 3-bit data if only one of the first through the fifth state signals is generated at the first logic level, to 3-bit data corresponding to the previous state signal if a state signal different from the previous state signal is generated once at the first logic level, to 3-bit data corresponding-to a new state signal if the new state signal different from the previous state signal is generated once again at the first logic level, and to a predetermined intermediate state for representing the state if a state signal different from the previous state signal is generated once at the first logic level.

26. The data recovery method of claim 25, wherein in step (e) the state selection signal is set to "000" if only the first state signal is generated at the first logic level; "001" if only the second state signal is generated at the first logic level; "010" if only the third state signal is generated at the first logic level; "011" if only the fourth state signal is generated at the first logic level; and "100" if only the fifth state signal is generated at the first logic level.

27. The data recovery method of claim 19, wherein step (e) comprises:

(e1) receiving and storing 3-bit data corresponding to the current state signal and outputting the data as the state selection signal;

(e2) generating a state position signal indicating the predetermined intermediate state;

(e3) receiving a new state signal and generating 3-bit data;

(e4) comparing the new 3-bit data and the current 3-bit data and generating a comparison signal;

(e5) generating a state position control signal for controlling the state position signal in response to the state position signal and the comparison signal; and (e6) selecting one of the new 3-bit data and the current 3-bit data, in response to the state position signal, and outputting the selected data as the state selection signal.

28. The data recovery method of claim 27, wherein step (e5) comprises:

(e51) selecting one of the state position signal and the state position signal inverted, in response to the comparison signal, and outputting the selected signal; and (e52) selecting one of the output signal of step (e51) and the inverted state position signal, in response to the state position signal, and outputting the selected signal as the state position control signal.

29. The data recovery method of claim 19, wherein in step (f), a plurality of selecting means are used for receiving m bits (where m is a natural number and is not zero) of the sample data formed of the plurality of bits, selecting one bit of the received m bits of the sample data in response to the state selection signal, and outputting the selected bit as a recovered data bit.

30. The data recovery method of claim 29, wherein the m bits of sample data input to the selecting means are 3 bits of the sample data.

31. The data recovery method of claim 29, wherein in step (f) 3 multiplexers are used.

* * * * *